United States Patent [19]

Boticki

[11] Patent Number: 5,261,447
[45] Date of Patent: Nov. 16, 1993

[54] PNEUMATIC REGULATING VALVE

[75] Inventor: John A. Boticki, Racine, Wis.

[73] Assignee: Fred Knapp Engraving Co., Inc., Racine, Wis.

[21] Appl. No.: 981,770

[22] Filed: Nov. 25, 1992

[51] Int. Cl.⁵ ...................... F16K 15/06; G05D 16/02
[52] U.S. Cl. .......................... 137/493.2; 137/505.37; 137/513.5
[58] Field of Search ............... 137/493.2, 493.3, 493.4, 137/599.2, 505.37, 505.45, 505.11, 513.5

[56] References Cited

U.S. PATENT DOCUMENTS

| | | | |
|---|---|---|---|
| 685,169 | 10/1901 | Paul | 137/599.2 X |
| 1,126,385 | 1/1915 | Burns | 137/599.2 |
| 1,324,110 | 12/1919 | Eaton | 137/599.2 X |
| 1,514,217 | 11/1924 | Messer | 137/505.45 X |
| 1,540,439 | 6/1925 | Thrall | 137/513.5 X |
| 2,352,307 | 6/1944 | Arey | 137/599.2 X |
| 3,062,525 | 11/1962 | Schutmaat | 137/513.5 X |
| 3,115,154 | 12/1963 | Dillon | 137/505.45 X |
| 3,420,257 | 1/1969 | Lansky et al. | 137/116.5 |
| 3,459,403 | 8/1969 | Royer | 137/513.5 X |
| 3,460,559 | 8/1969 | Pullen et al. | 137/116.5 |
| 3,567,193 | 4/1971 | Rothfuss | 137/116.5 |
| 3,625,247 | 12/1971 | Dargatz | 137/505.11 X |
| 4,037,621 | 7/1977 | Budzich | 137/596.13 |
| 4,498,499 | 2/1985 | Knorreck et al. | 137/627.5 |
| 4,574,834 | 3/1986 | Inoue | 137/505.25 |
| 4,632,358 | 12/1986 | Orth et al. | 251/117 |
| 4,693,267 | 9/1987 | Patterson | 137/116.5 |
| 4,811,756 | 3/1989 | Hall | 137/498 |
| 4,966,183 | 10/1990 | Williamson, Jr. | 137/116.5 |
| 5,072,749 | 12/1991 | Ligh | 137/116.5 |
| 5,090,438 | 2/1992 | Nimberger | 137/116.5 |

Primary Examiner—Stephen M. Hepperle
Attorney, Agent, or Firm—Jansson & Shupe

[57] ABSTRACT

The invention is an improvement in a pneumatic regulating valve of the type having a main flow path and a bleed passage. In the improvement, the bleed passage is in parallel with the main flow path and regulates a downward-trending pressure at the outlet port to prevent such pressure from diminishing or from rapidly diminishing. The valve also includes a check valve in series with the bleed passage for regulating an upward-trending pressure at the outlet port. Using a constant bleed orifice to substantially pressure-balance the check valve and a small-area protrusion on the check valve to reduce contact area, the check valve exhibits very low hysteresis.

17 Claims, 10 Drawing Sheets

PNEUMATIC REGULATING VALVE

FIELD OF THE INVENTION

This invention relates to fluid mechanics and pneumatics and, more particularly, to pneumatic regulating valves

BACKGROUND OF THE INVENTION

Industrial, commercial and health-care facilities often employ systems using a fluid under pressure to perform control or other functions. Where the fluid is a liquid, it is often oil under pressure and such systems are referred to as "hydraulic systems." Where the fluid is a gas, it is often air and systems using pressurized gas are called "pneumatic systems." The invention is adapted for use in a pneumatic system.

Such systems are used to power assembly tools, cylinders, automatic production tools, small hoists and dental and surgical equipment, among many others. One need only walk through a modern facility using powered devices of some sort and one is likely to see pneumatic control valves and systems, both pressure and vacuum, at work.

Such systems are usually powered from a pneumatic supply source, e.g., an air compressor or the like. Since such sources often have very poor pressure regulation, the "working" pressure used in the system is derived from a pressure regulator valve interposed between the source and the system. Such regulators provide an output or working pressure somewhat reduced from that of the pressure source.

And not all systems require the same "constancy" of working pressure. For example, a power assembly tool, e.g., a wheel lug wrench on an automotive assembly line, may work quite well at an actual pressure of, say, between 90-110 p.s.i. as a result of a regulator "set point" pressure of 100 p.s.i. In other words, such tool is not affected by variations in the set point pressure of plus or minus 10% or so.

On the other hand, there are precision systems where the working pressure downstream of the pressure regulator is required to be regulated with extreme accuracy. Medical equipment, respirators and the like are examples of such systems.

Prior art regulators have not been entirely satisfactory for systems requiring very closely regulated working pressure. One disadvantage of some known regulators is that pressure is regulated solely with a conventional diaphragm, main stem and main valve seat. These parts have relatively high mass and tend to behave too sluggishly for use in precision systems.

Other prior art regulators use a constant bleed passage as a way of preventing the working pressure from diminishing or from diminishing too rapidly. However, such passages are often functionally integral with the main valving mechanism and can become clogged with airborne particulates flowing toward or through such valving mechanism. And insofar as is known, prior art regulators have no satisfactory means for preventing (or at least diminishing the effect of) an upward-trending pressure in a closely-regulated working pneumatic line.

An improved regulator having exceptionally low hysteresis and provisions for regulating an upward-trending line pressure as well as a downward-trending line pressure (the former being the usual case in a vacuum system and the latter being the usual case in a pressure system) would be an important advance in the art.

As used herein, the terms "pressure regulator" refers to a regulator which control pressure above and below ambient atmospheric pressure, the latter otherwise being known as a vacuum regulator.

OBJECTS OF THE INVENTION

It is an object of the invention to provide an improved pressure regulator overcoming some of the problems and disadvantages of the prior art.

Another object of the invention is to provide an improved pressure regulator providing high-precision regulation.

Another object of the invention is to provide an improved pressure regulator having provisions for regulating an upward-trending line pressure.

Yet another object of the invention is to provide an improved pressure regulator having low backflow hysteresis.

Another object of the invention is to provide an improved pressure regulator having a bleed path separated from the main flow path.

Still another object of the invention is to provide an improved pressure regulator which is clog-resistant. How these and other objects are accomplished will become more apparent from the following detailed description and the drawing.

SUMMARY OF THE INVENTION

Summarized, the invention relates to a high-precision pneumatic regulating valve configured and arranged to maintain its outlet pressure within a narrow pressure range, irrespective of whether such outlet pressure tends to fall below or rise above the valve "set point." The invention is an improvement in a regulating valve having a main flow path and a bleed passage. In the improvement, the bleed passage is in parallel with the main flow path for regulating a downward-trending pressure at the outlet port to prevent such pressure from diminishing or from rapidly diminishing. The valve also has a substantially pressure-balanced, "low hysteresis" check valve in series with the bleed passage for regulating an upward-trending pressure at the outlet port.

If the pressure at the outlet port exceeds that at the inlet port, the disc-like check valve opens and exhibits slight movement within a cavity and along an axis concentric with a supply stem. The check valve has an upstream side and a downstream side and both sides are in flow communication with the bleed passage and, more specifically, with a bleed orifice in such passage for substantial pressure balance. That is, the pressure differential across the check valve (when closed) is about equal to the very small pressure drop across the bleed orifice. And when the check valve is closed, the orifice maintains the pressure at the downstream side at a value only slightly less than the pressure at the upstream side. The check valve may be said to thereby be substantially axially pressure balanced.

The valve supply stem, part of the primary pressure-regulating structure, has an axial passage which, together with the cavity, is along and part of the bleed passage. The cavity (cylindrical in shape) is defined in part by a generally flat first boundary surface and in a highly preferred arrangement, the bleed orifice is embodied as a small groove formed in the surface.

The cavity is also defined in part by a second, generally cylindrical boundary surface and the generally-circular check valve has at least one perimeter irregularity defining a bleed passage flow clearance between the check valve and the cylindrical boundary surface. In one embodiment, the irregularity is a "flat" and, preferably, four "flats" spaced about 90° apart. Each irregularity defines a small space between the check valve and the cavity surface so that bleed fluid can flow therethrough. Where the irregularities are spaced generally equidistant from one another, the check valve may be said to thereby be substantially pressure balanced laterally.

And that is not all. The improved regulator has yet other innovative features. Pneumatic valves, e.g., a check valve, can exhibit what is known as hysteresis which is described above. In the invention, the check valve has a body and a protrusion extending from the body. In a preferred arrangement, the protrusion is a generally circular, rather "knife-edged" ridge. Only the very small area of the protrusion, not the entire area of the body surface, contacts the first boundary surface. Therefore, the check valve is substantially prevented from sticking to the first boundary surface.

The new precision regulator valve is also configured in recognition of the fact that incoming air supplies sometimes have airborne particulates entrained in them. The new valve has a main valving seat and the bleed passage has a passage entrance. In the highly preferred arrangement, the portion of the main flow path extending from the inlet port to the main valving seat (and along which most contaminants are likely to flow) is spaced well away from the bleed passage entrance. In that way, such particulates are less likely to enter the bleed passage entrance (which has relatively small cross-sectional area) and the regulator is made clog resistant.

As to the bleed passage entrance, the valve has a spring retainer with a flat, annular face. The face has at least one groove formed in it to define the bleed passage entrance. Preferably, there are a pair of radial grooves formed in the face and spaced about 180° apart.

In another embodiment, aspects of the invention relate to a pneumatic regulating valve having a spring chamber, a port connected to a pressure-regulated line and also having a diaphragm with an exposed surface. The improvement comprises a valve stem having a coaxial passage and a lateral passage in flow communication with one another. The lateral passage is in flow communication with the line, the coaxial passage is in flow communication with the surface and the pressure at the surface is substantially equal to the pressure in the line.

A variant of the second embodiment involves a non-relieving pressure regulator where the pressure in the line, that pressure which is regulated, is above ambient pressure. In this variant, the surface is outside the chamber.

Another variant of the second embodiment involves a vacuum pressure regulator where the regulated pressure in the line is below ambient pressure. In this variant, the surface defines a boundary of the spring chamber.

A novel feature of the embodiments relates to the regulator supply stem. The improved supply stem for a regulator valve includes a rod portion with an enlarged stem head attached thereto at a rod/head junction. A coaxial passage extends partially along the rod portion and a lateral passage intersects the coaxial passage.

The regulator has a main port in flow communication between the two externally-connected regulator ports and a main valve seat which is controllably closed off by a valve seal on the stem. Such valve seal is preferably at the junction for pneumatic sealing against the regulator main valve seat. It has been found that when the difference in pressure across the main flow port is very low, the valve seal is preferably softer to effect a good seal. On the other hand, greater differences in such pressure can be well sealed by a harder valve seal which may exhibit enhanced durability. Accordingly, the valve seal is replaceable and for lower pressure differentials has a hardness in the range of 65 to 80 Durometer. For higher pressure differentials, the seal hardness is preferably in the range of 80 to 95 Durometer.

Further details of the invention are set forth in the following detailed description and the drawing.

DETAILED DESCRIPTION OF PREFERRED EMBODIMENTS

The new precision regulator valve 10 responds to the need for an extremely accurate pressure regulating device. As an overview description, the main valve portion 11 of regulator valve 10 responds to what will be referred to as "gross" changes in pressure at the outlet port 13 while the bleed passage 15 and check valve 17 respond to very small changes in such pressure, all to maintain, within a very narrow range, the pressure at the port 13 at a set value.

Figure 1:
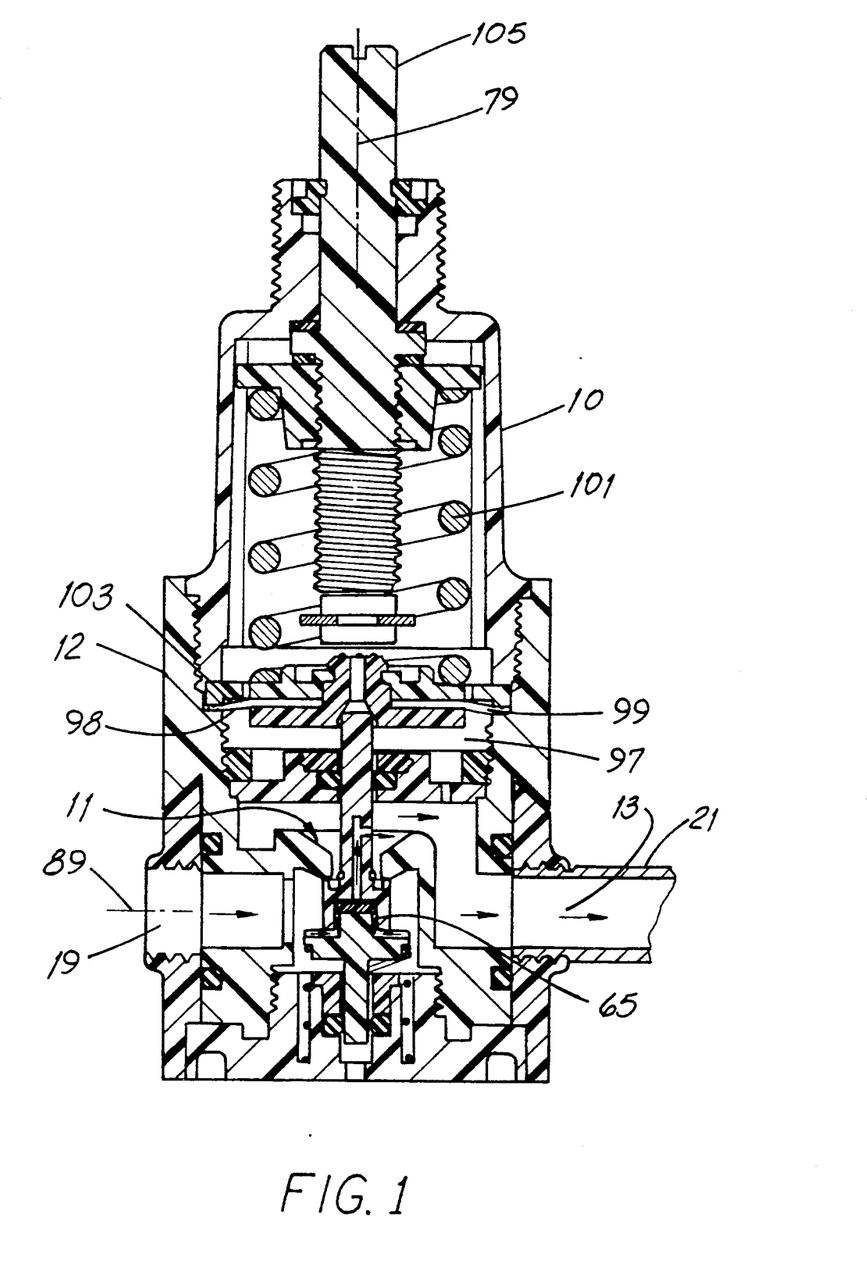
FIG. 1 is a cross-section elevation view of one embodiment of the valve taken along a viewing plane through the valve central longitudinal axis.
Figure 2:
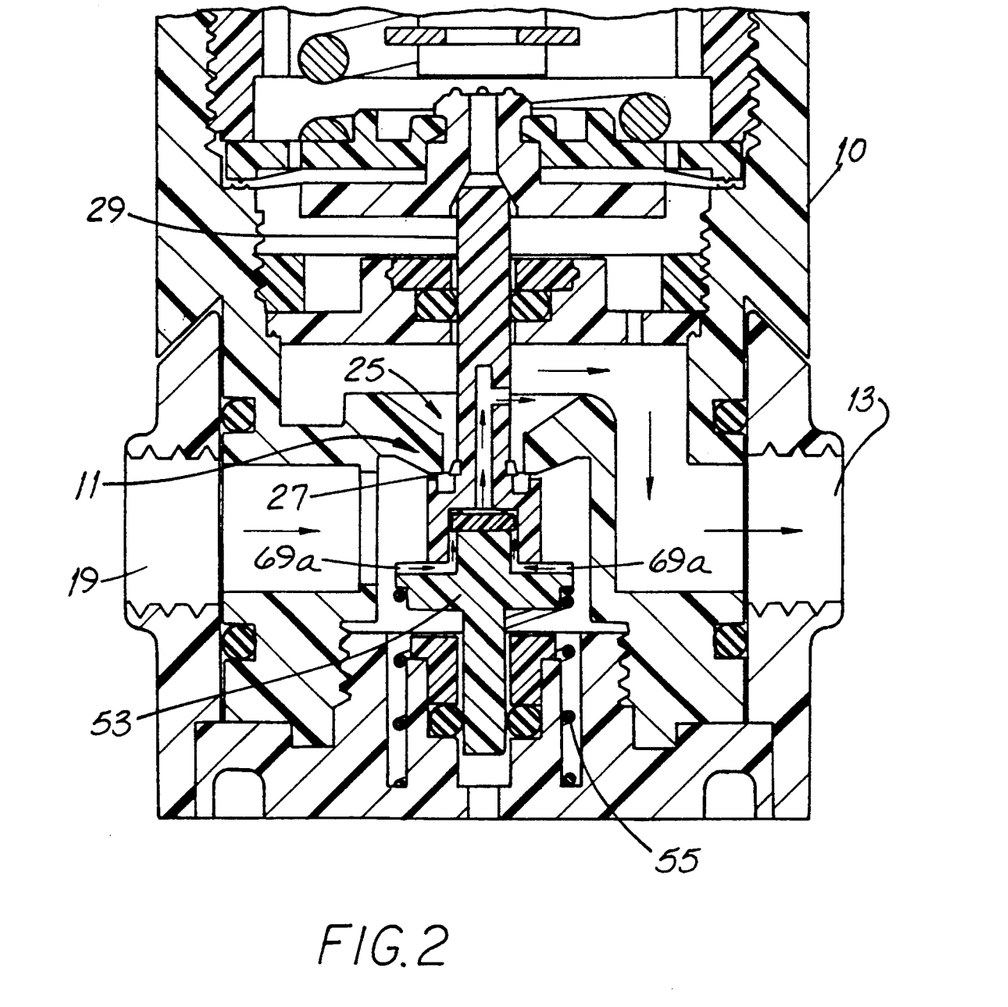
FIG. 2 is an enlarged view of a portion of the valve of FIG. 1. Parts are broken away and the main flow port is shown closed.
Figure 3:
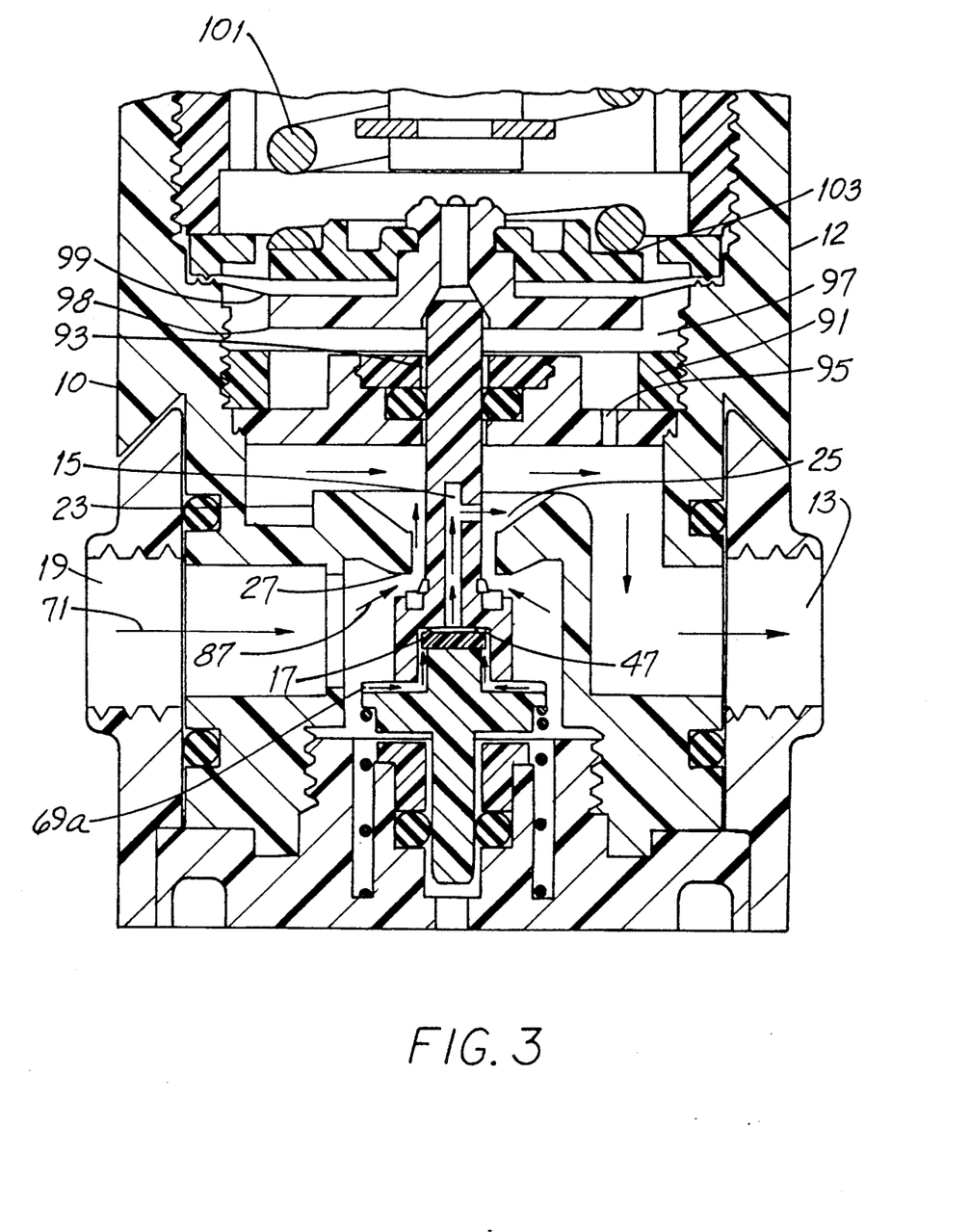
FIG. 3 is an enlarged view of a portion of the valve of FIG. 1. Parts are broken away and the main flow port is shown open.

Referring to FIGS. 1–3, the new regulator valve 10 includes a body 12 having coaxial inlet and outlet ports 19 and 13, respectively. The inlet port 19 is connected to an unregulated source of pressurized air (not shown) at, e.g., 125 p.s.i. and the outlet port 13 is connected by a regulated pressure line 21 to a work implement (not shown). Interposed between these ports 19, 13 is a vertically-oriented flow member 23 having a circular main flow port 25 bounded by an annular, main valve seat 27.

Figure 4:
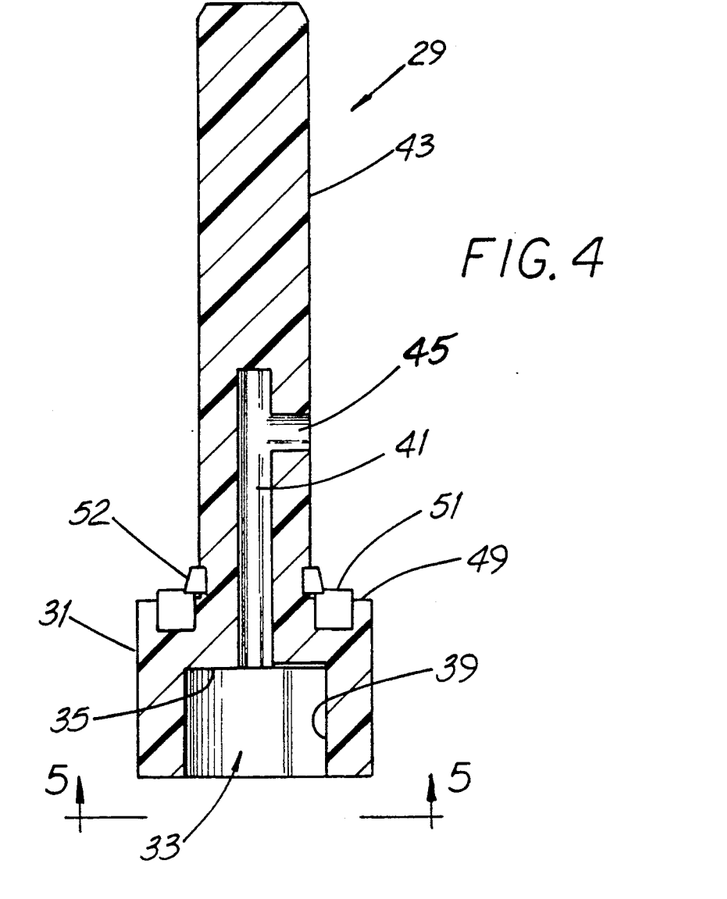
FIG. 4 is an enlarged view of one embodiment of the main supply stem shown in cross-section in FIGS. 1–3.
Figure 5:
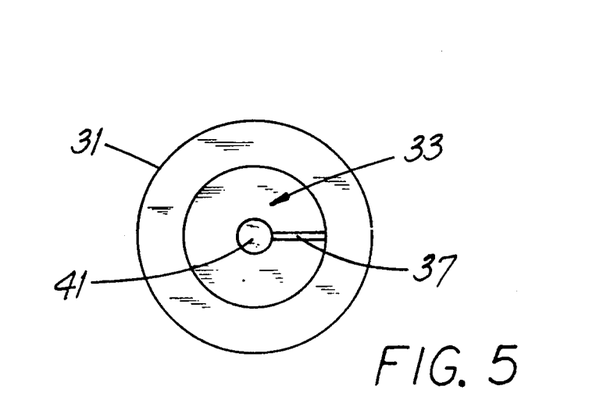
FIG. 5 is an end view of the stem shown in FIG. 4 taken along the viewing plane of 5—5 of FIG. 4.

Referring additionally to FIGS. 4 and 5, the elongate valve supply stem 29 (movement of which responds to relatively larger changes in pressure at the outlet port 13) includes an enlarged, cylindrical head 31 having an interior, generally cylindrical cavity 33. This cavity 33 has an annular, generally-flat first boundary surface 35 into which is formed a groove 37 extending from the cavity cylindrical boundary surface 39 to a coaxial passage 41 formed in the rod portion 43 of the stem 29. A lateral passage 45 communicates with the passage 41 and with the outlet port 13.

Figure 8:
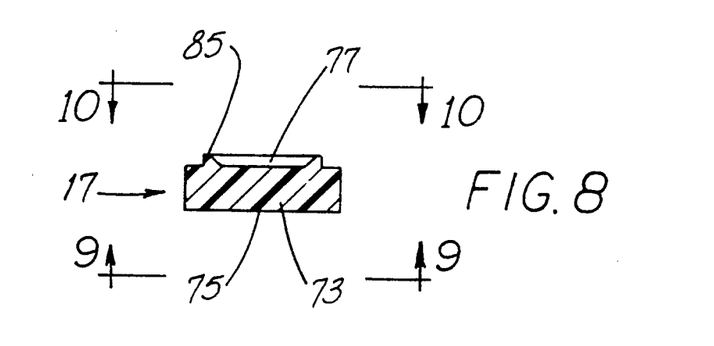
FIG. 8 is an enlarged side elevation view of the check valve component of the valve shown in FIGS. 1-3.
Figure 9:
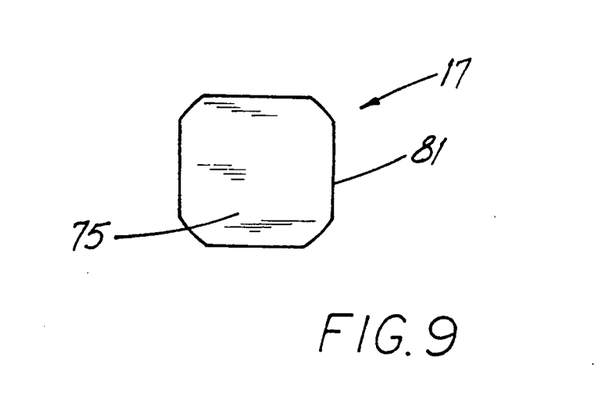
FIG. 9 is a view of the upstream side of the check valve taken along the viewing plane 9—9 of FIG. 8.
Figure 10:
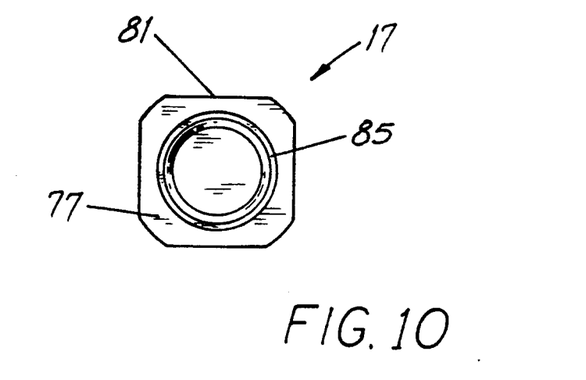
FIG. 10 is a view of the downstream side of the check valve taken along the viewing plane 10—10 of FIG. 8.

Referring to FIGS. 8–10, the check valve 17 is received in the cavity 33 and as is described in more detail below, the groove 37 and check valve 17 define a bleed orifice 47 having a relatively small cross-sectional area. It is to be appreciated that of those "path components" which make up the bleed passage 15, the groove 37 in the first boundary surface 35 (which in one embodiment measures about 0.005 inches wide by about 0.001 inches deep) has the smallest cross-sectional area. Therefore, such groove 37 is the primary limiting factor as to leakage rate along the bleed passage 15. At inlet pressure of, say, 125 p.s.i., the constant leak or bleed of air through the passage 15 is on the order of 400 standard cubic centimeters per minute (SCCM).

At the junction of the rod portion 43 and the head 31 is an annular surface 49 in which is seated an annular valve seal 51 held in place by a retaining ring 52. The seat 27 and seal 51 coact and constitute the primary or gross pressure regulator.

Figure 6:
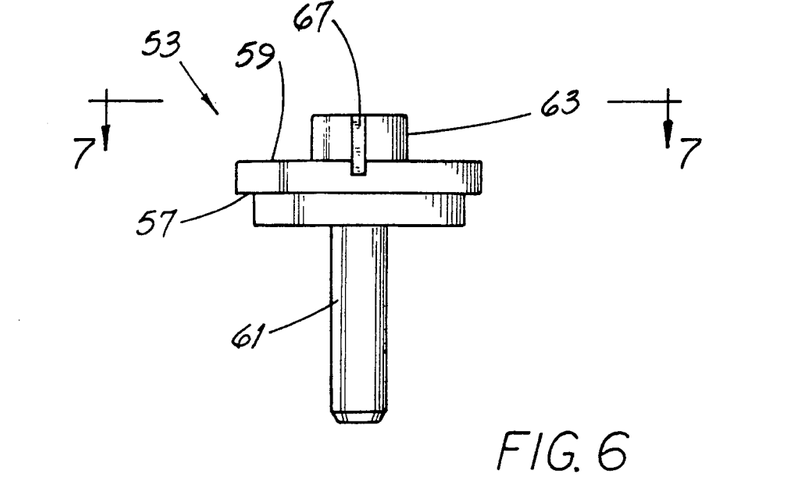
FIG. 6 is a side elevation view, in full representation, of the retainer component of the valve shown in FIGS. 1-3.
Figure 7:
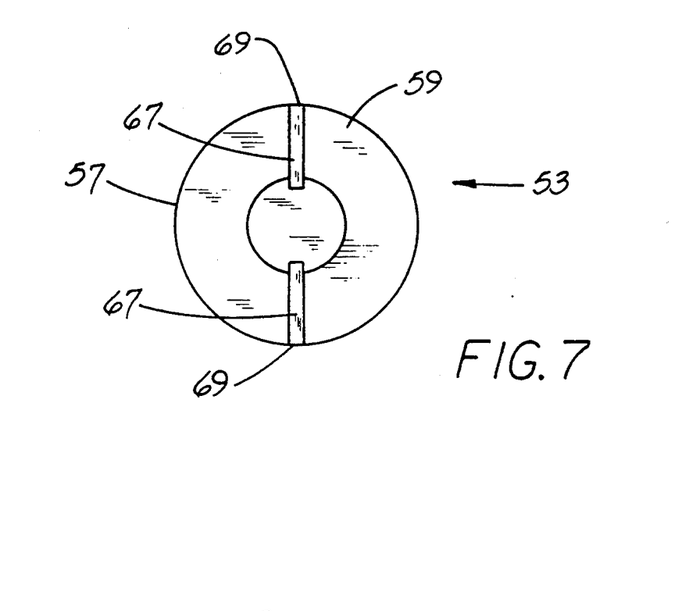
FIG. 7 is an end view of the retainer of FIG. 6 taken along the viewing plane 7—7 of FIG. 6.

Referring now to FIGS. 6 and 7, the valve 10 includes a retainer 53 urged toward the stem 29 by a spring 55 and has an enlarged disc-like central portion 57 with an annular, generally flat face 59. A lower stem 61 extends from the portion 57 and helps guide the retainer 53 for axial movement. The retainer 53 also has a generally cylindrical, upwardly-extending boss 63 having a diameter slightly less than that of the stem cavity 33 into which it fits. the diameters of the boss 63 and the cavity 33 are cooperatively selected to provide an annular space 65 therebetween and such space 65 (which is in "flow parallel" with the grooves 67 described below) can be considered to form part of the bleed passage 15.

Formed in the face 59 and the boss 63 are a pair of opposed, generally "L" shaped grooves 67 which also form a part of the bleed passage 15. And the radially outward terminus 69 of each groove 67 forms an entrance 69a to the bleed passage 15. For reasons explained below, the position of each entrance 69a relative to the main flow path 71 is a factor in making the valve 10 clog-resistant.

The disc-like valve 17 is interposed between the boss 63 and the first boundary surface 35 of the cavity 33. Such arrangement is best seen in FIGS. 2 and 3. The body 73 of such valve 17 has what is referred to as an "upstream side" 75 toward which air normally flows and a "downstream side" 77 away from which air normally flows. The height of the boss 63, the depth of the cavity 33 and the thickness of the check valve 17 are cooperatively selected so that the check valve 17 is capable of relatively limited movement along the axis 79 toward and away from the boundary surface 35.

Figure 11:
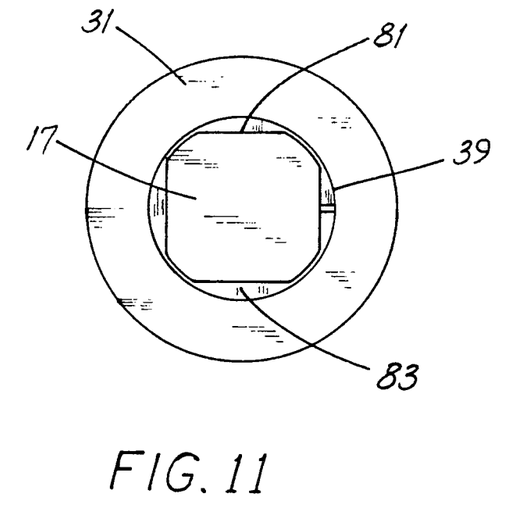
FIG. 11 is an end view from the perspective of FIGS. 5 and 9 showing the check valve within the cavity of the supply stem shown in FIGS. 4 and 5.

The check valve body 73, which is generally round, has at least one and preferably a plurality of peripheral irregularities 81. In a highly preferred arrangement, such irregularities 81 are embodied as four "flats" formed along the periphery of the valve body 73 about 90° apart. As shown in FIG. 11, the irregularities 81 and the cylindrical boundary surface 39 define a plurality of openings 83, all of which are part of the bleed passage 15. With symmetrical irregularities 81 as illustrated, the valve 17 is laterally pressure balanced.

At its downstream side 77, the valve 17 includes a protrusion 85 extending therefrom. When the check valve 17 is closed (but for the bleed orifice 47) against the surface 35, such protrusion 85 contacts the surface 35 and prevents the relatively-large-area side 77 from contacting the surface 35. As a result, there is essentially no tendency of the valve 17 to stick to the surface 35 and such valve 17 is extremely fast-acting. And since the protrusion 85 seals against the surface 35 (when the check valve 17 is closed), the only way for air to flow to the outlet port 13 is along the bleed orifice 47.

In a highly preferred embodiment, the protrusion 85 is a generally circular, edge-like ridge. However, other kinds of protrusions, e.g., ridge segments, stand-off legs and the like, are contemplated by the invention.

To aid in appreciating the foregoing, it will be helpful to reiterate those "path components" which define the bleed passage 15. In order from the inlet port 19 to the outlet port 13, they are the grooves 67 in the retainer 53, the openings between the check valve irregularities 81 and the boundary surface 39, the bleed orifice 47, the coaxial passage 41 and the lateral passage 45.

It is to be appreciated that the bleed passage 15 is not in series with the main flow port 25. Rather, such bleed passage 15 is in parallel with such port 25. For reasons mentioned below, the opportunity for clogging of the bleed passage 15 by high velocity airborne particles is significantly reduced.

There are two factors which help make the valve clog-resistant. The first is that the greater mass of higher-velocity air moving through the main flow port 25 (which occurs when the seal 51 is spaced from the seat 27), is more likely to carry along any particulates than is the much lower volume, lower velocity air stream flowing in the bleed passage 15. The second is apparent from an inspection of FIG. 3. The air moving from the inlet port 19 through the main flow port 25 travels along the main flow path 71, a portion of which includes an upward-sloping path 87 toward the main flow port 25.

The open entrances 69a of the two opposed grooves 67 in the disc-like central portion 57 of the retainer 53 are well below such upward-sloping path 87 and particulates frequently pass by such entrances 69a. And if the retainer 53 is oriented so that the opposed grooves 69a are the 90° from the inlet port axis 89, opportunity for particulates to find their way to the entrances 69a is further reduced.

The valve body 12 also includes a separator member 91 having a clearance hole 93 for the rod 43 and an opening 95 permitting flow and pressure communication between the diaphragm chamber 97 and the outlet port 13. Such opening 95 helps assure that the air pressure on the lower side 98 of the diaphragm 99 is essentially equal to that at the line 21. A compression spring 101 bears against the upper side 103 of the diaphragm 99 and its compressed height (and, therefore, the force exerted by such spring 101 against the upper side 103) is adjustable by a screw 105.

The operation of the new valve 10 will be described in two aspects, namely, the operation of the main valve 11 and the operation of the check valve 17 which is also referred to as the precision valve. It is first assumed that the force resulting from the outlet pressure multiplied by the exposed area of the lower side 98 of the diaphragm 99 ($P \times A = F$ in equation form) is less than the force caused by the spring 101. This occurs when the pressure in the line 21 is significantly below the pressure at the inlet port 19.

The spring 101 urges the diaphragm 99 and supply stem 29 downward, causing the seal 51 to move away from the seat 27. Higher pressure air then flows from the inlet port 19 through the main flow port 25 to the outlet port 13 to raise the pressure in the line 21 to the set point pressure. As the pressure in the line 21 approaches such set point pressure, the diaphragm 99 gradually moves upward and the seal 51 gradually closes against the seat 27, shutting off the main valve 11.

However, the bleed passage 15 remains open. But if the pressure at the outlet port 13 and inlet port 19 are essentially identical (a relatively rare occurrence) little or no air will be flowing in such bleed passage 15 since air flows from regions of higher pressure to regions of lower pressure.

The more likely event is that because of small leaks or intentional periodic expulsion of air from the work implement (not shown), the pressure in the line 21 will trend downward. Any reduction in pressure in the line 21 below that at the inlet port 19 will cause air to flow through the bleed passage 15. This prevents the pressure in the line 21 from diminishing or, at least, from diminishing as rapidly as otherwise might be the case.

To put it another way, for output or regulated pressures which may tend to fall only very gradually below the set point pressure, the parallel bleed passage 15 provides a small-volume source of supply to prevent that from occurring. However, the volumetric demand at the pressure-regulated outlet port 13 may be sufficiently great to "swamp" the capacity of the continuous bleed passage 15 and prevent it from maintaining a pressure. In that event, the main flow port 25 again opens.

And that is not all. The new pressure regulating valve 10 also operates to precisely maintain a set point pressure in the event of an upward-trending pressure at the outlet port 13. In that event (relatively uncommon), the pressure at the outlet port 13 exceeds that at the inlet port 19. In that instance, the check valve 17 instantly unseats (i.e., moves slightly downward as viewed in FIG. 3) to permit the outlet port 13 to "relieve," i.e., to communicate (via a "bleed" passage of greater cross-sectional area) with the inlet port 19. Stated otherwise, the body 73 functions as a one-way check valve 17 with a downstream orifice-leak feature.

Since the pressures on either side of the check valve 17 are typically very close to equal (differing only by the pressure drop along the orifice 47), such valve 17 (which has a low mass), is very nearly "force balanced" and can move extremely quickly. And the very small area of contact between the edge-like protrusion 85 and the cavity surface 35 helps avoid sticking adhesion. That is, the check valve 17 exhibits very low hysteresis. Further, since (in the highly preferred version), the irregularities 81 are spaced equidistant about the valve 17, the valve 17 is laterally force balanced since the pressure drops across the valve 17 at each irregularity 81 are nominally equal to one another. There are essentially no "tipping" forces on the body 73.

Figure 12:
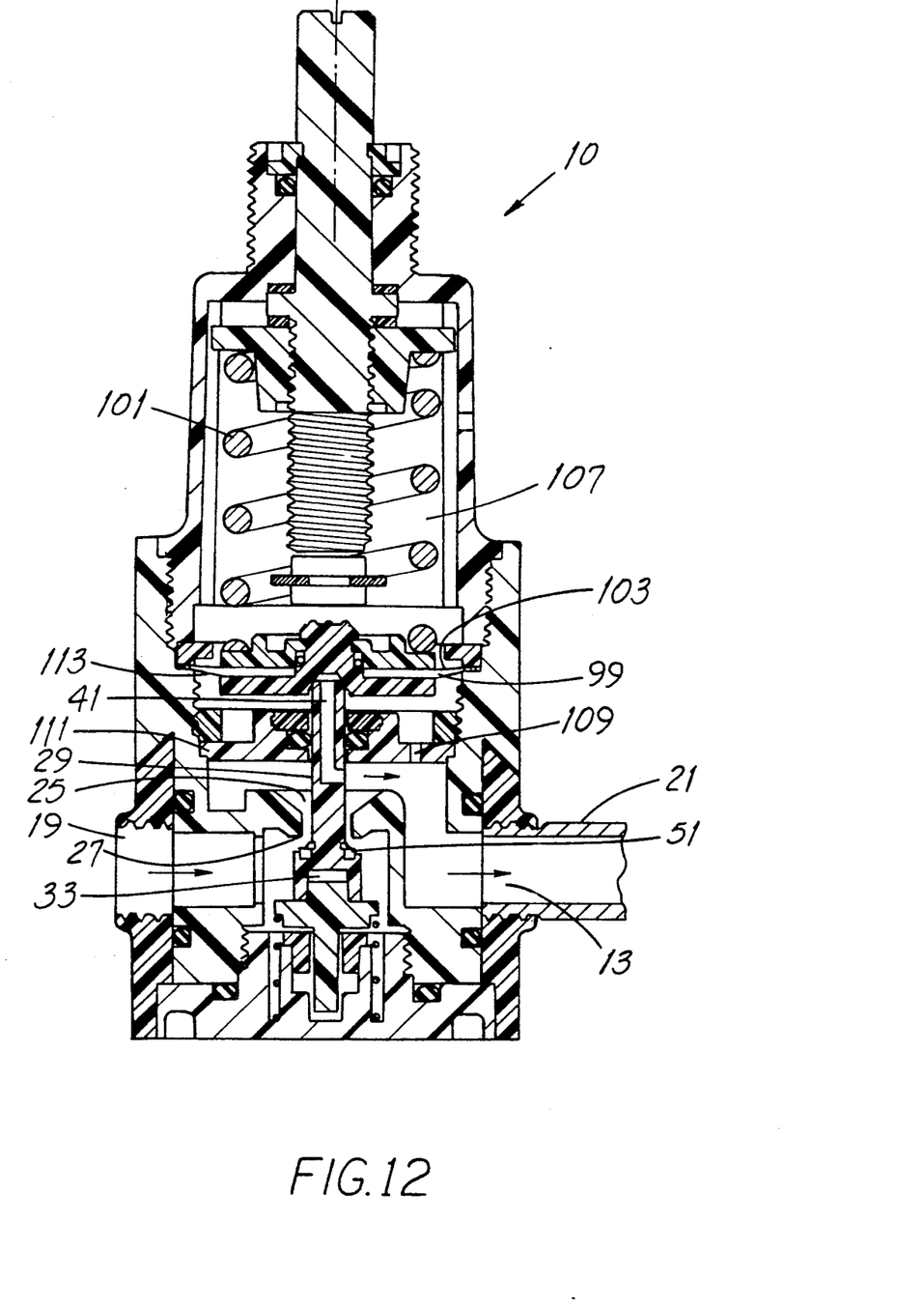
FIG. 12 is a cross-section elevation view of one variant of a second embodiment of the valve (configured as a non-relieving positive pressure regulator) taken along a viewing plane through the valve central longitudinal axis.

Referring next to FIG. 12, one variant of a second embodiment of the regulating valve 10 is configured as a pressure regulator for use in applications where the pressure at the outlet port 13 is above atmospheric ambient but below the pressure at the inlet port 19. As an example, the non-regulated (or perhaps poorly regulated) source of pressurized air is connected at the inlet port 19 and is at a pressure of nominally 125 p.s.i. The pressure to be maintained at the line connected to the outlet port 13 is 90 p.s.i.

The regulating valve 10 shown in FIG. 12 is of the non-relieving type in that the coaxial passage 41 in the stem 29 does not communicate with the stem cavity 33 and there is no check valve 17. Therefore, if the pressure at the outlet port 13 somehow exceeds the pressure at the inlet port 19, the valve 10 does not "relieve" an upward-trending pressure at port 13 as described above with respect to the first embodiment.

The regulating valve 10 has a diaphragm 99 which is imperforate and which has a side or surface 103 (the upper side as seen in FIG. 12) defining a boundary of the spring chamber 107. Such diaphragm 99 also has a lower surface 113 and because of the hole 109 through the pressure plate 111, the surface 113 is maintained at the same pressure as the line connected to the port 13.

Figure 14:
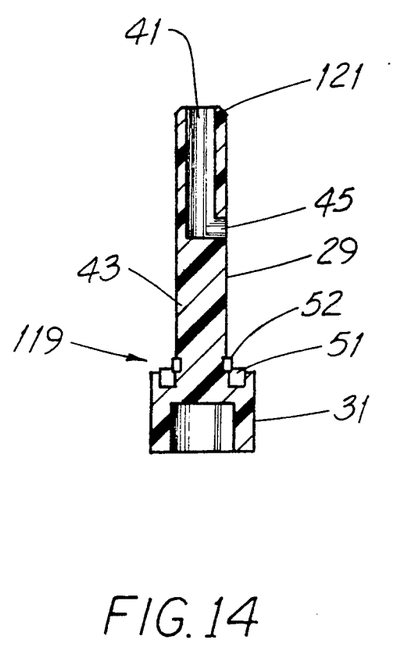
FIG. 14 is an enlarged view of another embodiment of the main supply stem shown in cross-section in FIGS. 1-3.

Referring also to FIG. 14, the valve supply stem 29 includes a coaxial passage 41 and a lateral passage 45 in flow communication with one another. The passage 45 is also in flow communication with the outlet port 13 and, thus, with the line 21, the pressure in which is to be regulated. Because the coaxial passage 41 opens at the distal end of the stem 29, such passage 41 is in flow communication with the diaphragm surface 113 which is outside the spring chamber 107. Thus, the pressure at the surface 113 is substantially equal to the pressure at the outlet port 13.

In use, if the pressure at the port 13 is below the set point, the force of the spring 101 on the diaphragm 99 urges the stem 29 downward away from the valve seat 27. Higher pressure air then flows from the inlet port 19 through the main flow port 25 to the outlet port 13 to raise the pressure in the line 21 to the set point pressure. Because of the hole 109 and the passage 41, the pressure across the surface 113 "follows" and is substantially equal to the pressure at the outlet port 13. As the pressure in the line 21 approaches such set point pressure, the diaphragm 99 gradually moves upward and the seal 51 gradually closes against the seat 27, shutting off the main valve 11.

Figure 13:
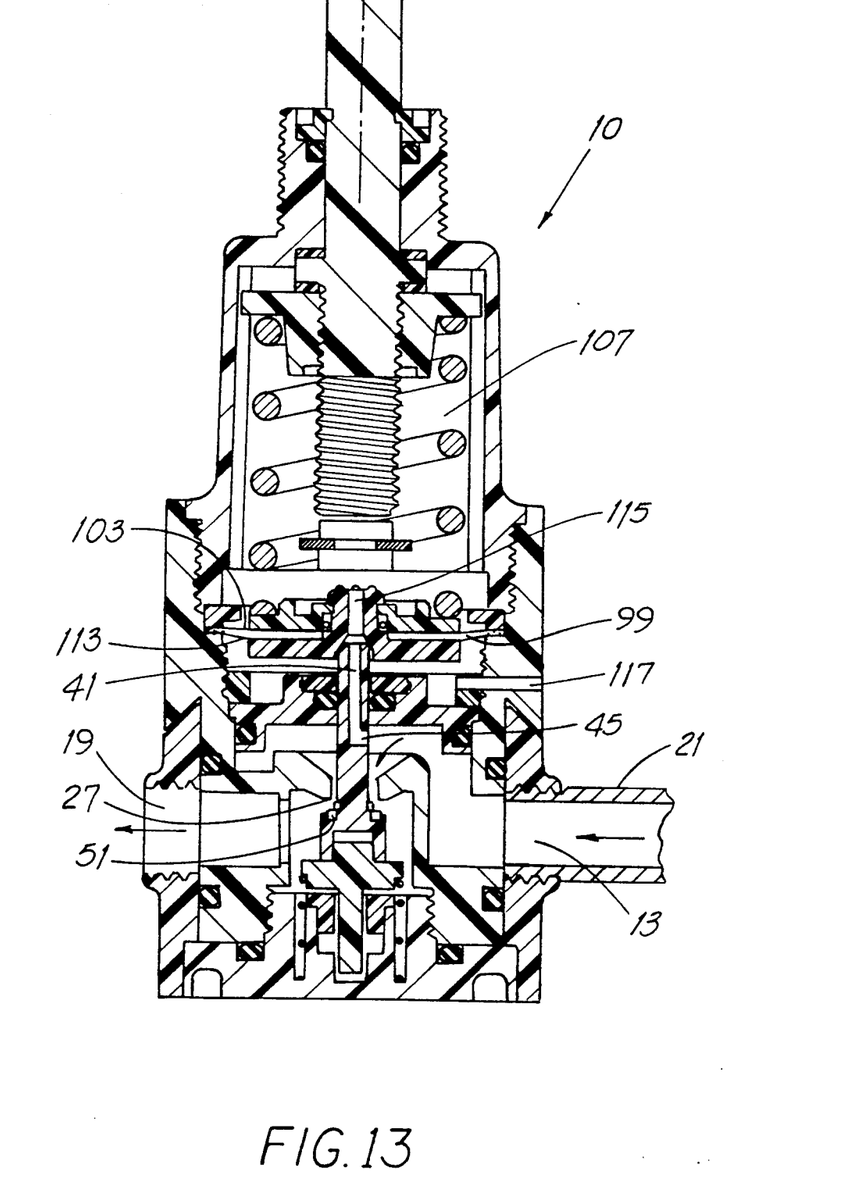
FIG. 13 is a cross-section elevation view of another variant of a second embodiment of the valve (configured as a vacuum or negative pressure regulator) taken along a viewing plane through the valve central longitudinal axis.

Referring next to FIG. 13, another variant of the second embodiment is configured as a vacuum pressure regulating valve 10. When so used, the pressure in the "working" line connected to the outlet port 13 is below atmospheric ambient pressure. Such pressures are often measured in terms of the height in inches of a column of mercury, e.g., 10" Hg. In common parlance, such a pressure is sometimes referred to as a vacuum even though such pressure is well above absolute vacuum.

In the regulating valve 10 shown in FIG. 13, the diaphragm 99 has a central aperture 115 so that the passages 41, 45 are in flow communication between the surface 103 and the outlet port 13. The pressure in the spring chamber 107 (which is otherwise sealed) will therefore "follow" the pressure at the port 13 and be substantially equal to such pressure. On the other hand, the pressure at the diaphragm surface 113 is maintained at atmospheric ambient pressure by the vent opening 117.

In use, it is first assumed that the pressure at the outlet port 13 (and, therefore, the pressure on the diaphragm surface 103) is at atmospheric ambient pressure. It is also assumed that the user has attached a vacuum pump (not shown) to port 19 to evacuate the air from the line connected to the port 13. Under these assumed conditions, the downward force caused by the spring 101 is the only force acting on the diaphragm 99. Therefore, the diaphragm 99 urges the stem 29 "full down" and the seal 51 is away from the seat 27.

When the vacuum pump is started, the pressure at the port 13 starts to decline. As it does so, the pressure at the upper surface 103 similarly declines. A pressure differential develops across the diaphragm 99 because the pressure at the surface 103 is below that at the surface 113. Therefore, such pressure differential urges the diaphragm 99 upward and the stem 29 follows until the pressure at the port 13 (now below ambient pressure) is equal to the set point, at which time the seal 51 substantially closes against the seat 27. If the pressure at the port 13 undesirably rises above the vacuum set point pressure, the diaphragm 99 moves slightly downward to again slightly open the main flow port 25.

The supply stem 29 shown in FIG. 14 is closely similar to that shown in FIG. 4 in that the rod portion 43 and the stem head 31 are attached to one another at the junction 119. The coaxial passage 41 extends partially along the rod portion 43 and in the version shown in FIG. 14, such passage 41 opens at the stem distal end 121.

The valve seal 51 is held in place by the retaining ring 52. Such seal 51 is provided in one of several hardness ranges or can be replaced with a seal 51 of another hardness. When the regulating valve 10 is used in applications involving very low pressure differentials across the main port 25, a seal hardness in the range of 65 of 80 Durometer is preferred. On the other hand, in applications with higher pressure differentials, a seal hardness in the range of 80 to 95 Durometer is preferred.

While the invention has been described in connection with a few exemplary embodiments, it is to be understood that it is not limited thereby.

I claim:

1. In a pneumatic regulating valve having a main flow path, a bleed passage, an inlet port and an outlet port, the improvement wherein:
   the bleed passage is in parallel with the main flow path; for regulating a downward-trending pressure at the outlet port;
   the valve includes a substantially pressure-balanced check valve in series with the bleed passage for regulating an upward-trending pressure at the outlet port; and,
   the bleed passage is open, irrespective of the relationship of the pressure at the outlet port and the pressure at the inlet port to one another.

2. The valve of claim 1 wherein:
   the bleed passage includes a bleed orifice;
   the check valve moves along an axis; and,
   when the check valve is closed, the orifice maintains the pressure at the downstream side at a value only slightly less than the pressure at the upstream side, whereby the check valve is substantially axially pressure balanced.

3. The valve of claim 2 including a supply stem having an axial passage and a cavity along the bleed passage and the check valve is confined in the cavity for limited movement.

4. The valve of claim 3 wherein the cavity is defined in part by a first boundary surface and the bleed orifice is embodied as a groove formed in the surface.

5. The valve of claim 4 wherein the cavity is defined in part by a second, generally cylindrical boundary surface, the check valve is disc-like and has at least one perimeter irregularity defining a bleed passage flow clearance between the check valve and the cylindrical boundary surface.

6. The valve of claim 5 wherein the check valve has a plurality of perimeter irregularities spaced generally equidistant from one another whereby the check valve is substantially pressure balanced laterally.

7. The valve of claim 1 including a supply stem having a cavity defined in part by a first boundary surface and the check valve has a body and a protrusion extending from the body and contacting the first boundary surface whereby the check valve is substantially prevented from sticking to the first boundary surface.

8. The valve of claim 9 wherein the protrusion is a generally circular ridge.

9. The valve of claim 1 including a main valving seat and an inlet port, the bleed passage has a passage entrance and wherein:
   the portion of the main flow path extending from the inlet port to the main valving seat is spaced from the bleed passage entrance,
   whereby the regulator is made clog resistant.

10. The valve of claim 9 including a spring retainer having a face and wherein the face has at least one groove formed therein defining the bleed passage entrance.

11. The valve of claim 10 wherein the face is circular and has a pair of radial grooves formed therein and spaced about 180° apart.

12. In a pneumatic regulating valve having a main flow path, a bleed passage and an outlet port, the improvement wherein:
   the bleed passage is in parallel with the main flow path for regulating a downward-trending pressure at the outlet port;
   the valve includes a substantially pressure-balanced check valve in series with the bleed passage for regulating an upward-trending pressure at the outlet port;
   the check valve has an upstream side and a downstream side and both sides are in flow communication with the bleed passage;
   the valve includes a supply stem having an axial passage and a cavity along the bleed passage and the check valve is confined in the cavity for limited movement;
   the bleed passage includes a bleed orifice;
   the cavity is defined in part by a first boundary surface and the bleed orifice is embodied as a groove formed in the surface;
   the check valve moves along an axis; and, when the check valve is closed, the orifice maintains the pressure at the downstream side at a value only slightly less than the pressure at the upstream side and thereby substantially pressure balances the check valve axially.

13. The valve of claim 12 wherein the cavity is defined in part by a second, generally cylindrical boundary surface, the check valve is disc-like and has at least one perimeter irregularity defining a bleed passage flow clearance between the check valve and the cylindrical boundary surface.

14. The valve of claim 13 wherein the check valve has a plurality of perimeter irregularities spaced generally equidistance from one another whereby the check valve is substantially pressure balanced laterally.

15. In a pneumatic regulating valve having a main flow path, a bleed passage and an outlet port, the improvement wherein:
the bleed passage is always open and is in parallel with the main flow path for regulating a downward-trending pressure at the outlet port;
the valve includes a substantially pressure-balanced check valve in series with the bleed passage for regulating an upward-trending pressure at the outlet port; and
the valve includes a supply stem having a cavity defined in part by first boundary surface and the check valve has a body and a protruding generally circular ridge extending from the body and contacting the first boundary surface whereby the check valve is substantially prevented from sticking to the first boundary surface.

16. In a pneumatic regulating valve having a main flow path, a bleed passage and an outlet port, the improvement wherein:
the bleed passage is in parallel with the main flow path for regulating a downward-trending pressure at the outlet port; and,
the valve includes a substantially pressure-balanced check valve in series with the bleed passage for regulating an upward-trending pressure at the outlet port;
the valve includes a main valving seat, an inlet port and a spring retainer having a face;
the bleed passage has a passage entrance embodied as at least one groove formed in the face;
the main flow path has a portion extending from the inlet port to the main valving seat;
the portion is spaced from the bleed passage entrance whereby the regulator is made clog resistant.

17. The valve of claim 16 wherein the face is circular and has a pair of radial grooves formed therein and spaced about 180° apart.

* * * * *